United States Patent [19]
Roberts

[11] Patent Number: 5,479,554
[45] Date of Patent: Dec. 26, 1995

[54] SPLICE CLOSURE APPARATUS FOR CONTINUOUS OPTICAL GROUND WIRE COMMUNICATIONS CABLE AND SPLICING SYSTEM

[75] Inventor: Gene Roberts, Clinton, Mo.

[73] Assignee: Windsor Communications, Windsor, Mo.

[21] Appl. No.: 180,053

[22] Filed: Jan. 11, 1994

[51] Int. Cl.[6] .................................................. G02B 6/44
[52] U.S. Cl. .......................... 385/135; 385/136; 385/137; 385/100; 385/99
[58] Field of Search .............................. 385/95, 99, 100, 385/101, 134, 135, 136, 137, 138, 139; 174/70 R, 72 R, 72 C, 23 R, 77 R, 93, 99 R, 97

[56] References Cited

U.S. PATENT DOCUMENTS

| | | | |
|---|---|---|---|
| 2,823,248 | 2/1958 | Schaefer | 174/77 R X |
| 3,130,259 | 4/1964 | Rischard et al. | 174/77 R X |
| 3,569,608 | 3/1971 | Ance | 174/93 |
| 3,728,467 | 4/1973 | Klayum et al. | 174/38 |
| 4,262,167 | 4/1981 | Bossard et al. | 174/92 |
| 4,494,822 | 1/1985 | Harvey | 385/99 X |
| 5,007,801 | 4/1991 | Roberts | 174/77 R |
| 5,042,901 | 8/1991 | Merriken et al. | 385/135 |
| 5,133,039 | 7/1992 | Dixit | 385/135 |
| 5,155,303 | 10/1992 | Bensel, III et al. | 174/93 |
| 5,198,620 | 3/1993 | Behrendt et al. | 174/74 R |
| 5,210,374 | 5/1993 | Channell | 174/77 R |
| 5,218,664 | 6/1993 | O'Neill et al. | 385/135 |
| 5,235,134 | 8/1993 | Jaycox | 174/87 |
| 5,280,556 | 1/1994 | Jones | 385/139 |
| 5,323,480 | 6/1994 | Mullaney et al. | 385/135 |

FOREIGN PATENT DOCUMENTS

| | | | |
|---|---|---|---|
| PCT/US90/ 06844 | 5/1991 | WIPO | 385/135 X |

Primary Examiner—Brian Healy
Attorney, Agent, or Firm—Litman, McMahon and Brown

[57] ABSTRACT

A splice closure apparatus for a multi-layer combination ground and fiber optic cable, commonly called an optical ground cable, includes a weather impervious outer cylinder made of an impact and corrosion resistant material. The cylinder is open at both ends and is designed to hold a splicing assembly including a pair of sealing end caps, one for each end of the cylinder. Each end cap includes an elastomeric sealing material sandwiched between two rigid plates bolted together with the bolts extending through the elastomeric material. When the end cap bolts are tightened, the elastomeric material is expanded outward to sealingly engage the outer cylinder. At least one of the end caps includes cable through bores through which cables to be spliced are introduced into the splicing assembly and closure and each of the end cap plates include four cable slots leading from the outside thereof to respective cable through holes in the elastomeric layer. The elastomeric layer is segmented such that a pair of outer sections between respective slot pairs are removable and a pair of outer and inner cable clamps are separable such that a continuous multi-layer cable can be inserted and securely anchored without the need to first sever the cable.

22 Claims, 3 Drawing Sheets

5,479,554

SPLICE CLOSURE APPARATUS FOR CONTINUOUS OPTICAL GROUND WIRE COMMUNICATIONS CABLE AND SPLICING SYSTEM

BACKGROUND OF THE INVENTION

1. Field of the Invention

The present invention relates generally to a splice closure apparatus for a cable or the like, and more specifically to a weather impervious splice closure apparatus for containing and providing ready access to a splice of a combination ground and fiber optic communications cable, commonly called an optical ground cable.

2. Description of the Related Art

Recent advances in communication technology have resulted in an ever increasing need for voice communications, video and data information transfer services, which capacity can most reliably and economically be provided by the use of fiber optic communications network paths. With the explosion of fiber optic cables being installed, there is an ever increasing need for additional physical paths for them.

The existing high tension electrical power distribution system in the United States provides an ideal vehicle for the placement of fiber optic cables. This is due to a number of factors, most notable of which are valuable property easements and rights of way which are already established. In addition, the high tension towers themselves, by serving as a stable, elevated platform for the fiber optic cables, act to provide a secure cable environment while simultaneously providing ready maintenance access to the fiber optic cables themselves. Most high tension electrical towers have ground cables attached to and extending between the topmost spars of each tower for protection from stray electrical discharges and as lightning arresters. Specialized multi-layer combination ground and fiber optic communications cables have been developed expressly for replacing these ground cables and typically include a continuous hollow metallic tube through which one or more fiber optic bundles are strung. This hollow tube is surrounded by a ground shield made up of a stranded aluminum wire layer, thus yielding a multi-layer coaxial cable typically called an optical ground cable.

Inevitably, such optical ground cables must be spliced, during initial installation to connect cable runs, and, after they are placed in operation, for maintenance or repair. Unlike conventional communication cables, however, a single fiber optic bundle can carry hundreds of thousands of simultaneous telephone conversations or data transmissions. Needless to say, a total interruption of such a bundle would be disastrous. Therefore, maintenance access must be provided to an existing optical ground cable splice or for implementing a new spice of a portion of a fiber optic cable without totally disrupting its continuity.

U.S. Pat. No. 5,007,701, ('701 patent) issued Apr. 16, 1991 to the present inventor, discloses a splice closure apparatus in which a rigid, cylindrical and weather impervious outer structure is open at both ends. A pair of end caps each include an elastomeric sealing material sandwiched between a pair of rigid plates. At least one of the end caps has openings for the passage of cables therethrough into the interior of the closure where an anchoring member is positioned to receive the cable ends and secure a splice. The elastomeric sealing material in each end cap is compressed against the sides of the outer cylinder by the plates on either side when a number of through bolts are tightened, thus forming a weather tight seal between each end cap and the cylinder wall. In addition, in each end cap with cable openings, the elastomeric material is simultaneously urged tightly against the cables, thus also forming a weather tight seal between the end cap and the cables.

While the '701 patent provides significant advantages over the prior art, it is not entirely suitable for splicing optical ground cables due to the multi-layer construction of such cables. In addition, as earlier mentioned, often in such cables, only a portion of an existing cable needs to be spliced, and the splice placed into a protective splice closure. This must be done without totally severing the cable and thus disrupting the extensive communication network it represents. In the '701 patent, as in other prior art splice closures, a continuous existing cable cannot be introduced into the closure without first totally severing the cable since the cable through passages are isolated in the end caps.

It is clear then that a need exists for a splice closure apparatus which is weather impervious and which can accommodate multi-layer optical ground cables. Such a closure apparatus must be capable of providing ready access to the interior thereof. In addition, the closure apparatus should accommodate the introduction of a continuous cable for a splicing operation without requiring the cable to be severed prior to introduction in the closure.

SUMMARY OF THE INVENTION

In the practice of the present invention, a splice closure apparatus for a combination ground and fiber optic cable includes a weather impervious outer cylinder made of an impact and corrosion resistant material. The cylinder is open at both ends and is designed to hold a splicing assembly including a pair of sealing end caps, one for each end of the cylinder. A first of the end caps may be similar in structure to that of the '701 patent, i.e. an elastomeric sealing material is sandwiched between two rigid plates bolted together with the bolts extending through the elastomeric material. When the end cap bolts are tightened, the elastomeric material is expanded outward to sealingly engage the outer cylinder. The splice assembly includes a skeletal frame connected between the first end cap and a second of the end caps through which cables to be spliced are introduced into the splicing assembly and closure. The second end cap also has an elastomeric material layer sandwiched between an inner and an outer plate, but each of the plates include four cable slots leading from the outside thereof to respective cable through holes in the elastomeric layer. The elastomeric layer is segmented such that a pair of outer sections between respective slot pairs are removable. The second end cap has attached thereto a pair of separable outer cable clamps sized to accommodate the outer, grounding sleeve of the optical ground cable and a pair of separable inner cable clamps, sized to accommodate the smaller, inner protective tube surrounding the optical fiber bundles. With this arrangement, with the outer elastomeric material segments removed, a continuous cable can be inserted into the cable clamps via the slots and thus into the splicing assembly without the need to sever the cable. The cable can then be securely clamped in place via both inner and outer cable clamps and the elastomeric material segments replaced prior to installation of the splicing assembly in the outer protective cylinder.

Attached to the skeletal frame are a pair of cable returns which encompass an arc segment with a diameter allows the fiber optic bundle to be doubled back on itself without exceeding a critical angle at which light will no longer be transmitted along the fiber strands. In addition, a centrally mounted splice tray support is provided for anchoring a variety of splicing trays for facilitating splicing operations.

The splice closure apparatus is a part of a splicing system in which it is mounted on a high tension electrical tower or the like and sufficient excess optical ground cable is provided around the splice closure to allow it to be lowered to the ground and taken into a protective environment, such as a work vehicle. A splice closure receptacle can be permanently attached to the tower for accommodating the closure apparatus.

OBJECTS AND ADVANTAGES OF THE PRESENT INVENTION

The objects and advantages of the present invention include: providing a splice closure apparatus for an optical ground cable; providing such a closure apparatus which includes an outer protective cylinder which is open at both ends, and which is constructed of an impact and weather resistant material; providing such a closure apparatus in which a splicing assembly including a pair of end caps connected by a skeletal frame is sized to fit within the protective cylinder; to provide such an apparatus in which each end cap is constructed of an elastomeric sealing material sandwiched between a pair of rigid plates, with the elastomeric material being compressible via the plates to form a weather proof seal with the inside surface of the cylinder; providing such an apparatus in which at least one of the end caps includes inner and outer cable clamps for firmly holding a cable to be spliced therein; to provide such an apparatus in which the clamping end clamp includes cable slots in the plates and removable portions of the elastomeric seal which collectively allow a continuous cable to be clamped therein for splicing without the necessity of first severing the cable; providing a cable splicing system in which such a closure apparatus which can be mounted on a high tension electrical tower or the like, but which allows the splice closure to be lowered to the ground for maintenance operations without severing the cable contained therein; providing such a splicing system in which additional loops of optical ground cable are provided at the tower location to permit the splicing closure to be lowered to the ground without interrupting the communication network; and providing such a splice closure apparatus and splicing system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

II. Splicing System

Figure 1:
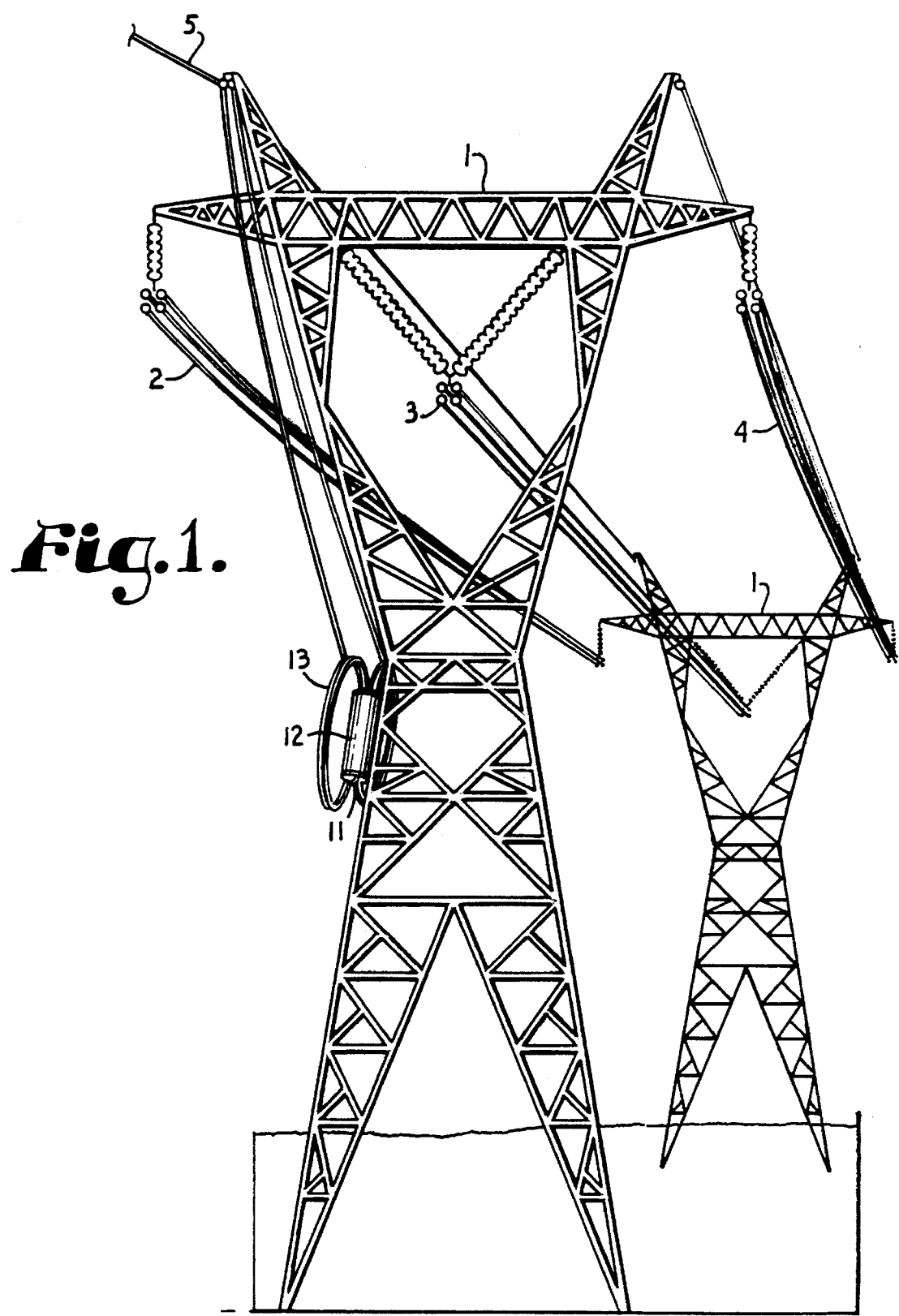
FIG. 1 is a perspective view of a pair of high tension electrical transmission towers carrying an optical ground cable with the forward tower supporting a splice closure apparatus and splicing system in accordance with the present invention.

Referring to the drawings in more detail, and particularly to FIG. 1, reference numeral 1 designates one of a number of high tension electrical towers which carry a conventional trio of high voltage electrical lines 2–4. In addition, a pair of top mounted ground cables 5 provide a continuous grounding link between the towers. In FIG. 1, the left ground cable is comprised of a multi-layer optical ground cable 6. In effect, the optical ground cable 6 encases an optical fiber bundle which is "piggybacked" onto the electrical transmission system, resulting in increased revenues for the electric utility company and an economical routing for the communications company which owns the optical communications link. Of course, both of the ground cables 5 could be optical ground cables, if desired.

Periodically along the optical communications link, the fiber optic strands within the optical ground cable 6 must be spliced to connect separate lengths of cable or to repair existing cable runs. In order to house the splices and protect them from weather, a splice closure apparatus 11 is provided, which closure apparatus 11 is shown inserted in a protective sleeve 12 mounted on the tower 1. However, splicing the individual fine optical fibers within the optical ground cable 6 is tedious and exacting work, which cannot be readily accomplished while a workman is standing on one of the towers 1. Therefore, the closure apparatus 11 must be capable of being lowered to the ground and taken inside a protective environment, such as a work truck (not shown) for splicing and/or maintenance without severing the optical ground cable 6. Therefore, the closure apparatus 11 is mounted approximately half way down the tower 1 and a substantial excess of optical ground cable 6 is provided near the closure apparatus 11 in the form of large cable loops 13. Thus, when splicing or other maintenance needs to be done on an existing communications link, the closure apparatus 11 is removed from the protective sleeve 12 and lowered to the ground by using the excess cable in the loops 13.

III. Splice Closure Apparatus

Figure 2:
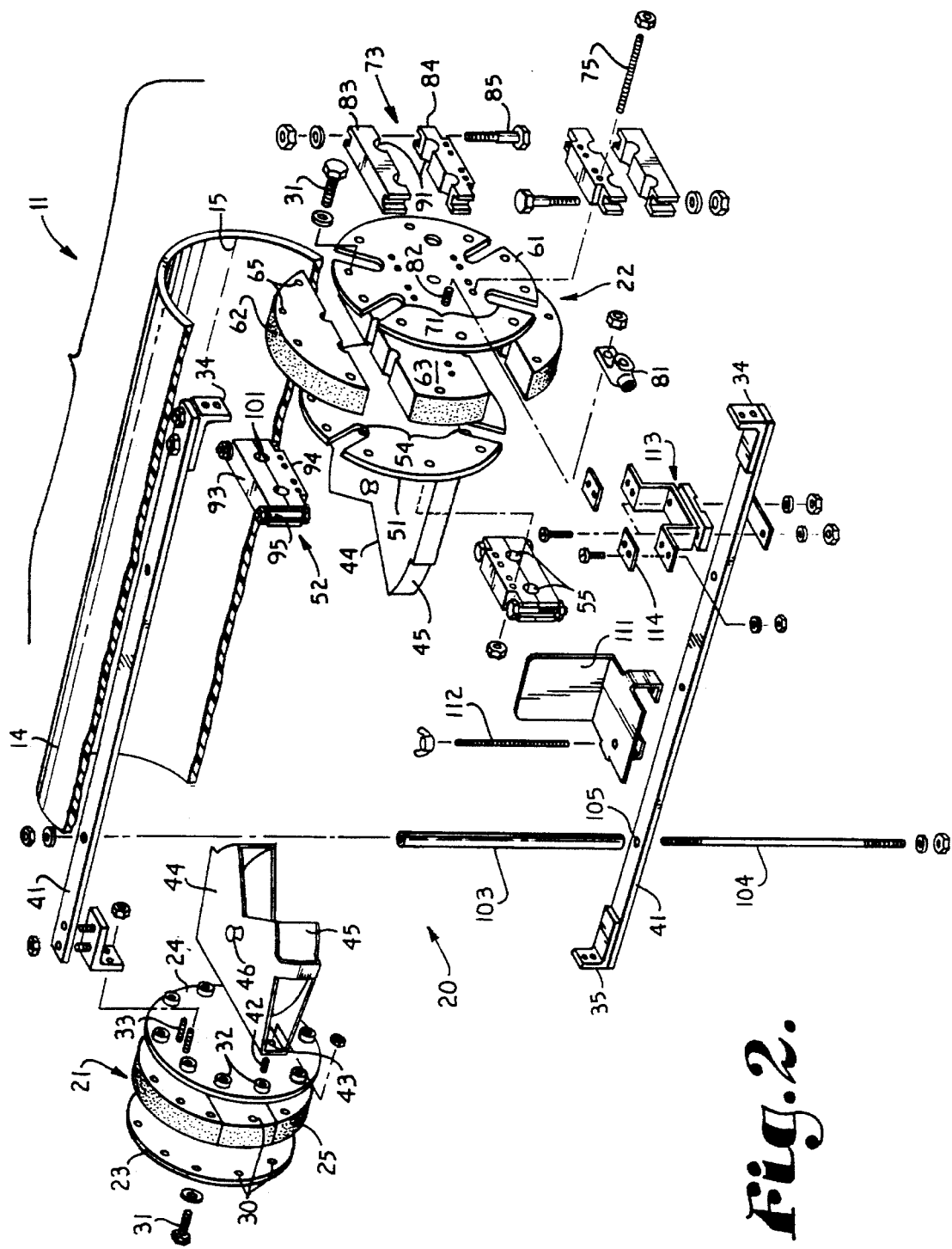
FIG. 2 is an enlarged, exploded view of the splice closure apparatus of FIG. 1, with the outer cylinder partially broken away.
Figure 3:
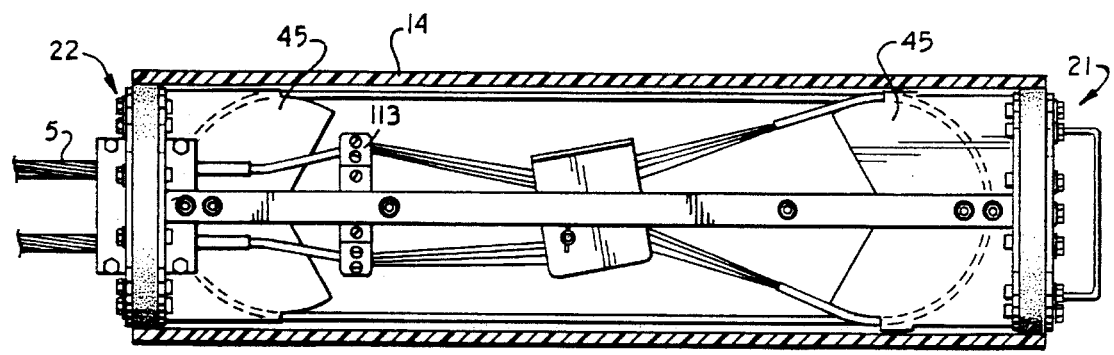
FIG. 3 is an enlarged, cross-sectional view of the splice closure apparatus, with an optical ground cable clamped therein for splicing.
Figure 4:
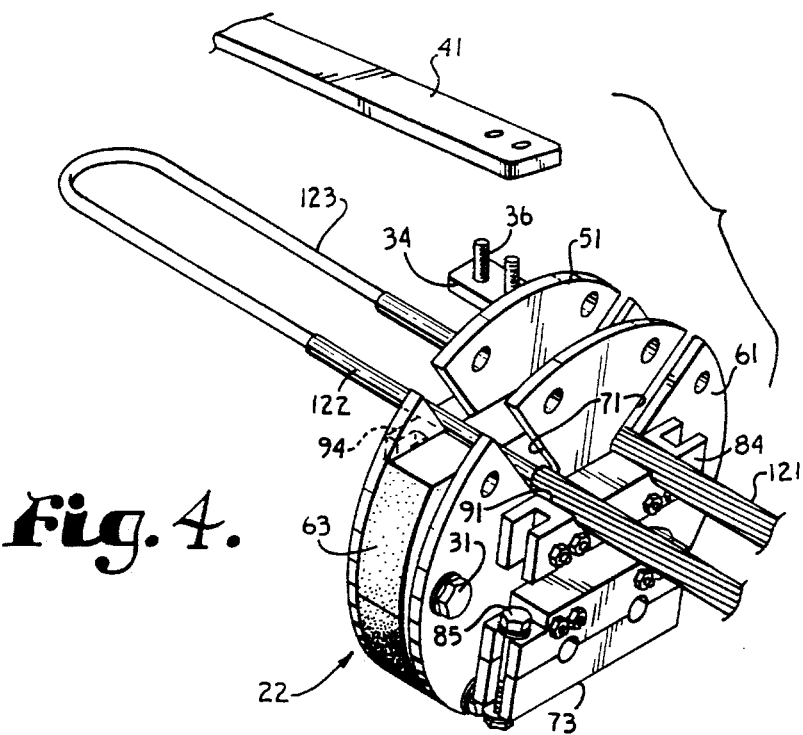
FIG. 4 is an enlarged, fragmentary perspective view of an end cap of the splice closure apparatus, partially disassembled to allow a continuous loop cable section to be inserted and clamped therein.

Referring to FIGS. 2–4, the inventive splice closure apparatus 11 is illustrated in greater detail. Referring to FIG. 2, the closure apparatus 11 is shown in an exploded view, with an outer cylindrical housing 14 shown partially broken away to illustrate the interior components. The housing 14 has an opening 15 at either end thereof, and a splicing assembly 20 including a pair of end caps 21 and 22 is sized to fit within the cylindrical housing 14. The end cap 21 comprises a pair of rigid plates 23 and 24 with a resilient elastomeric member 25 inserted therebetween. A number of through holes 30 are provided through both plates 23 and 24 as well as the elastomeric member 25 to accommodate an equal number of bolts 31 which thread into fixed nuts 32 attached to the inside of the plate 24. Two pairs of threaded studs 33 are also attached to the inside of the plate 24 to accommodate a corresponding pair of through holes 34 in each of a pair of L shaped mounting flanges 35. Each flange 35 also has a pair of threaded studs 36 attached thereto for accommodating a pair of through bores in one end of one of a pair of connecting strap steel members 41. An additional pair of studs 42 is also attached to the inside of the plate 24 to accommodate a pair of bores 43 in a cable return support 44. A partially circular cable return member 45 is removably attached within the support 44 via a bolt 46. The diameter of the cable return members 45 is sized to assure that an optical cable which doubles back on itself by extending around the cable return member 45 will not reach a critical angle at which light is no longer internally reflected, thus assuring a continuous path for optical communications signals for optical cable looped through the return members 45.

The opposite end of each of the connecting members 41 is attached to an inside plate 51 of the end cap 22 via an additional pair of the flanges 34. An additional cable return support 44 and cable return 45 is also attached to the plate 51, as are a pair of inner cable clamps 52. The plate 51 includes four slots 54 extending from the outer periphery toward the center thereof, and a pair of cable accommodating bores 55 in each of the inner clamps 52 and 53 are aligned with the innermost portion of a corresponding one of the slots 54.

Sandwiched between the inner plate 51 and an outer plate 61 of the end cap 22, is an elastomeric layer comprised of three separate pieces 62–64. Each elastomeric piece 62–64 includes a number of bores 65 for accommodating a like number of plate connecting bolts 31. The outer plate 61 includes four matching slots 71 which are aligned with the slots 54 in the inner plate 51, and which are also aligned with a like number of bores 72 between separate inner and outer elastomeric pieces 63 and 62 and 64, respectively. A pair of outer cable clamps 73 are attached to the outside of the outer plate 61 via a number of threaded studs 75. A ground wire connecting clamp 81 is also attached to the outside of the outer plate 61 via an additional threaded stud 82.

Each of the outer cable clamps 73 are identical and include two separable pieces 83 and 84 which are connected via threaded bolts 85. Each piece 83 and 84 includes a pair of curved depressions 91 which, when the pieces 83 and 84 are connected, form a pair of cable receiving bores. Similarly, each of the inner cable clamps 52 and 53 are identical and each includes two separable pieces 93 and 94 which are also connected via threaded bolts 95. The pair of cable receiving bores 55 are formed from mating curved depressions 101 in each piece 93 and 94. The inner cable clamp bores 55 are smaller in diameter than the outer cable clamp bores 92, for reasons which will be detailed below.

Further components of the splicing assembly 20 include a separating sleeve 103 extending between the straps 41, which sleeve 103 is secured in position via a threaded rod 104 extending through bores 105 in each strap 41. A splice tray support member 111 is also attached to the lower strap 41 via threaded rods 112. The tray support member 111 can be configured to support a variety of splice trays (not shown) which do not form a part of the present invention. A spreading clamp 113 is also attached to the lower strap 41 via threaded bolts. The clamp 113 includes a pair of spreading clamp members 114 for securing and spreading individual fiber optic strands preparatory to splicing operations.

IV. Operation

Referring to FIGS. 3 and 4, the operation of the splice closure apparatus 11 will now be described. When portions of a continuous optical communications link need to be spliced while leaving other portions intact, the continuous cable_ is inserted in one side of the splicing assembly 20, as shown in FIG. 4. A number of the bolts 31 connecting the inner plate 51 and the outer plate 61 of the end cap 22 are taken out and the outer elastomeric piece 62 removed. In addition, the outer clamp pieces 83 and 84 are separated as are the inner clamp pieces 93 and 94. One of the straps 41 is also disconnected at one end of the slicing assembly 20, as shown in FIG. 4, the cable returns 45 are separated from the cable return supports 44, and the spacing sleeve 103 is disconnected.

The optical ground cable 6 itself is a multi-layered structure including an outer twisted wire ground sheathing 121, an inner protective aluminum tube 122, and a number of optical fiber bundles 123. Prior to its introduction in the splicing closure apparatus 11, the outer ground sheathing 121 is stripped from a length of the cable 5. Next, after leaving a portion which extends past the removed outer ground sheathing 121, the inner protective tube 122 is also stripped away from the cable, leaving the optical fiber bundles 123 exposed.

The optical ground cable 6 is then inserted into the end cap 22 via the slots 71 in the outer plate 61 and the slots 54 in the inner plate 51, with the intact outer ground sheathing 121 being seated in the curved depressions 91 in the outer clamp piece 84 and the intact inner tube 122 extends between the elastomeric pieces 62 and 63 and is then seated in the smaller bores 55 in the inner clamp 52. The missing outer elastomeric piece 62 is then reinserted between the inner plate 51 and the outer plate 61, and the bolts 31 reconnected. The inner clamp 52 and the outer clamp 73 are then assembled and the respective bolts 85 and 92 tightened to securely hold the cable 5 securely in position. The optical fiber bundles are then alternately wrapped about the cable returns 45 to take up excess slack and the fibers to be spliced are spread on the spreader 113. Individual optical fibers 124 are then spliced as needed on a splicing tray (not shown), and the separated components of the splicing assembly 20 are reattached. Next the splicing assembly 20 is inserted into the outer cylindrical housing 14 and the bolts 31 in each of the end caps 21 and 22 are tightened. The tightening of these bolts constricts the elastomeric layers 25 and 62–64, causing them to bulge outward, contacting the inside surface of the outer cylindrical housing 14 and also closing off any openings around the inner protective tube 122 of the optical ground cable 6. The elastomeric layers 25 and 62–64 thus act to secure the end caps 21 and 22, respectively, tightly within the cylindrical housing 14, and also provide a weathertight seal about the optical ground cable 6 and between the end caps 21 and 22 and the cylindrical housing 14. At the same time, the combination of the tightened inner cable clamps 52 and the outer cable clamps 73 provide a secure, rigid support for the optical ground cable 6, thus protecting the delicate optical fiber strands 123. Referring to FIG. 3, a handle 124 can be attached to the end cap 21 for improving ease of handling and the insertion and removal of the 11 closure apparatus 11 from the tower mounted protective sleeve 12.

While the closure apparatus 11 has been illustrated as including just one end cap 22 through which an optical ground cable can be inserted, it should be apparent that both end caps 21 and 22 could include matching cable clamps, thus allowing one or more optical ground cables 5 to extend through the closure apparatus 11 from one end through the other. In addition, while the closure apparatus 11 has been shown mounted on a lattice type high tension electrical tower 1, it is equally useful on steel, wood or fiberglass telephone poles, as well as in underground installations. A number of elastomeric materials are suitable for the elastomeric layers 25 and 62–64, including polyurethane (unsaturated casting resin) made by the Dickey Company and by ETCO SPECIALTY PRODUCTS.

It is to be understood that while certain forms of the present invention have been illustrated and described herein, it is not to be limited to the specific forms or arrangement of pans described and shown.

What is claimed and desired to be secured by Letters Patent is as follows:

1. A splice closure apparatus comprising:
   (a) a container having an opening;
   (b) an end cap adapted to close said opening, said end cap including an aperture via which a cable can be extended through said end cap and into said container; and
   (c) a cable clamp attached to a first side of said end cap, said cable clamp including a clamp opening which is aligned with said aperture in said end cap and including means for clamping said cable as it extends through said end cap by constricting said clamp opening to a size which is smaller than said aperture in said end cap.

2. A splice closure apparatus comprising:
   (a) a container having an opening;
   (b) an end cap adapted to close said opening, said end cap including an aperture via which a cable can be extended through said end cap and into said container;
   (c) a first cable clamp attached to a first side of said end cap, said first cable clamp including a first clamp opening which is aligned with said aperture in said end cap and including means for clamping said cable as it extends through said end cap by constricting said first clamp opening; and
   (d) a second cable clamp attached to a second side of said end cap opposite said first side, said second cable clamp including a second clamp opening which is aligned with said aperture in said end cap and including means for clamping said cable as it extends through said end cap by constricting said second clamp opening.

3. A splice closure apparatus as in claim 2, and further comprising:
   (a) a second aperture extending through said end cap via which said cable can exit said container; and
   (b) a third and a fourth cable clamp attached to said first and second sides of said end cap, respectively, each of said third and fourth cable clamps including a respective clamp opening, each of which is aligned with said second aperture in said end cap and including means for clamping said cable as it extends through said end cap by constricting the respective clamp opening.

4. A splice closure apparatus comprising:
   (a) an elongate container open in at least one end, said container being constructed of a material which is resistant to weather;
   (b) a first end cap adapted to cover the open end of said container, said first end cap including at least a pair of apertures via which a cable can be extended through said first end cap and into said container and thence through said first end cap and out of said container; and
   (c) an outer and an inner cable clamp attached, respectively, to the outside and the inside of said first end cap, each said cable clamp including openings which are aligned with said apertures in said end cap and including means for clamping said cable at two positions as it extends through said first end cap by constricting said openings.

5. A splice closure apparatus as in claim 4, wherein said first end cap comprises:
   (a) a pair of relatively rigid plates;
   (b) an elastomeric seal positioned between said plates; and
   (c) means for drawing said plates toward each other to thereby compress said elastomeric seal, causing it to expand radially.

6. A splice closure apparatus as in claim 5, wherein:
   (a) each of said plates includes at least a pair of slots extending from the periphery thereof to respective ones of said apertures.

7. A splice closure apparatus as in claim 6, wherein:
   (a) said elastomeric seal includes at least two separable segments, with one of said segments positioned between and encompassing a portion of each of said plates which includes said slots and apertures.

8. A splice closure apparatus as in claim 7, wherein:
   (a) a pair of cable through bores are provided in said elastomeric seal between said separable segments, with said through bores being aligned with said clamp openings and apertures.

9. A splice closure apparatus as in claim 7, wherein:
   (a) each of said clamps includes a separable section which, when removed, allows said cable to be inserted into corresponding clamp openings of both the inner and outer clamps via the corresponding slots in said plates, such that a continuous cable can be inserted and clamped in said first end cap without first severing the cable.

10. A splice closure apparatus as in claim 9, wherein:
    (a) there are two each of said inner and outer clamps, each with two openings, each said plate has four of said slots and four of said apertures, and the elastomeric seal has three separable segments with two of the segments positioned between and encompassing a respective portion of each of said plates with each said portion including a pair of said slots and apertures each; such that a pair of continuous cables can be inserted into said closure apparatus.

11. A splice closure apparatus as in claim 4, wherein:
    (a) the openings in said inner clamp are smaller than the openings in said outer clamp whereby the inner and outer clamps can securely clamp in position different respective layers of a multi-layer cable.

12. A splice closure apparatus as in claim 11, wherein:
    (a) each of said plates includes at least a pair of slots extending from the periphery thereof to respective ones of said apertures;
    (b) said elastomeric seal includes at least two separable segments, with one of said segments positioned between and encompassing a portion of each of said plates which includes said slots and apertures;

(c) a pair of cable through bores are provided in said elastomeric seal between said separable segments, with said through bores being aligned with said clamp openings and apertures; and (d) each of said clamps includes a separable section which, when removed, allows said cable to be inserted into corresponding clamp openings of both the inner and outer clamps via the corresponding slots in said plates, such that a continuous multi-layer cable can be inserted and clamped in said first end cap without first severing the cable.

13. A splice closure apparatus as in claim 4, wherein said cylinder is open at both ends, said cable is a multi-layer optical ground cable including a fiber optic bundle and said splice closure apparatus further comprises:

(a) a splicing assembly including a said first end cap and a second end cap interconnected by a skeletal framework, said framework with said end caps being of a length such that it fits within said cylinder with said end caps sealing respective ones of said open ends, said splicing assembly further comprising:

(i) a pair of cable return members each of which encompasses an arc with a diameter which permits fiber optic fibers within said bundle to loop back on themselves at less than their critical optical angle;

(ii) a spreading clamp for spreading and clamping said fiber optic bundles; and (iii) a splice tray support including means for securing a splicing tray to said framework.

14. A system for splicing a multi-layer optical ground cable which extends between supports of an elevated transmission system, the system comprising:

(a) a splice closure apparatus for containing and protecting a splice of said multi-layer optical ground cable, said splice closure apparatus allowing a continuous multi-layer cable to be introduced and secured therein for splicing without requiring it to be severed;

(b) a quantity of excess cable on either side of the splice closure apparatus which is sufficient to allow the splice closure to be lowered to the ground from an elevated position without being severed; and (c) means for mounting the splice closure apparatus in said elevated position on one of said supports.

15. A system as in claim 14, wherein said splice closure apparatus comprises:

(a) an elongate container open in at least one end, said container being constructed of a material which is resistant to weather;

(b) an first end cap adapted to cover an open end of said container, said first end cap including at least a pair of apertures via which a cable can be extended through said first end cap and into said container and thence through said first end cap and out of said container; and (c) an outer and an inner cable clamp attached, respectively, to the outside and the inside of said first end cap, each said cable clamp including openings which are aligned with said apertures in said first end cap and each said clamp including means for constricting said openings to thereby clamp said cable as it extends through said first end cap.

16. A splice closure apparatus as in claim 15, wherein said splice closure apparatus further comprises:

(a) at least a pair of slots in each of said plates extending from the periphery thereof to respective ones of said apertures;

(b) said elastomeric seal includes at least two separable segments, with one of said separable segments being positioned between and encompassing a portion of each of said plates which includes said slots and apertures;

(c) a pair of cable through bores are provided in said elastomeric seal between said separable segments of said elastomeric seal, with said through bores being aligned with said clamp openings and said apertures; and (d) each of said clamps includes a separable portion which, when removed, allows said cable to be inserted into corresponding clamp openings of both the inner and outer clamps via the corresponding slots in said plates, such that a continuous multi-layer cable can be inserted and clamped in said first end cap without first severing the cable.

17. A splice closure apparatus as in claim 16, wherein:

(a) the openings in said inner clamp are smaller than the openings in said outer clamp whereby the inner and outer clamps can securely clamp in position different respective layers of said multi-layer cable.

18. A splice closure apparatus comprising:

(a) an elongate container open in at least one end;

(b) a first end cap adapted to cover the open end of said container, said first end cap including at least a pair of apertures via which a cable can be extended through said first end cap and into said container and thence through said first end cap and out of said container; said first end cap also comprising (i) a pair of relatively rigid plates;

(ii) an elastomeric seal positioned between said plates;

(iii) means for drawing said plates toward each other to thereby compress said elastomeric seal, causing it to expand radially; and (iv) each of said plates includes at least a pair of slots extending from the periphery thereof to respective ones of said apertures.

19. A splice closure apparatus as in claim 18, and further comprising:

(a) an outer and an inner cable clamp attached, respectively, to the outside and the inside of said first end cap, each said cable clamp including openings which are aligned with said apertures in said end cap and including means for clamping said cable at two positions as it extends through said first end cap by constricting said openings.

20. A splice closure apparatus as in claim 19, wherein:

(a) said elastomeric seal includes at least two separable segments, with one of said segments positioned between and encompassing a portion of each of said plates which includes said slots and apertures.

21. A splice closure apparatus as in claim 20, wherein:

(a) a pair of cable through bores are provided in said elastomeric seal between said separable segments, with said through bores being aligned with said clamp openings and apertures.

22. A splice closure apparatus as in claim 21, wherein:

(a) each of said clamps includes a separable section which, when removed, allows said cable to be inserted into corresponding clamp openings of both the inner and outer clamps via the corresponding slots in said plates, such that a continuous cable can be inserted and clamped in said first end cap without first severing the cable.

* * * * *